J. F. FERGUSON.
TRAP.
APPLICATION FILED APR. 13, 1909.

1,016,405.

Patented Feb. 6, 1912.

Witnesses
E. F. Stewart
E. Daniels

Inventor
Julius F. Ferguson,
By C. A. Snow & Co.
Attorneys

UNITED STATES PATENT OFFICE.

JULIUS F. FERGUSON, OF YPSILANTI, MICHIGAN, ASSIGNOR OF ONE-HALF TO MORRIS S. HALL, OF YPSILANTI, MICHIGAN.

TRAP.

1,016,405. Specification of Letters Patent. Patented Feb. 6, 1912.

Application filed April 13, 1909. Serial No. 489,654.

*To all whom it may concern:*

Be it known that I, JULIUS F. FERGUSON, a citizen of the United States, residing at Ypsilanti, in the county of Washtenaw and State of Michigan, have invented a new and useful Trap, of which the following is a specification.

This invention has relation to traps for mice or similar animals, and it consists in the novel construction and arrangement of its parts, as hereinafter shown and described.

The object of the invention is to provide a simple and an effective trap wherein bait of a permanent nature may be deposited and maintained, and also to provide, in connection with the body of the trap, a detachable cell, which is adapted to receive the animal after it has been entrapped, and, by removing the cell, the animal be destroyed without affecting the body of the trap.

Figure 1:
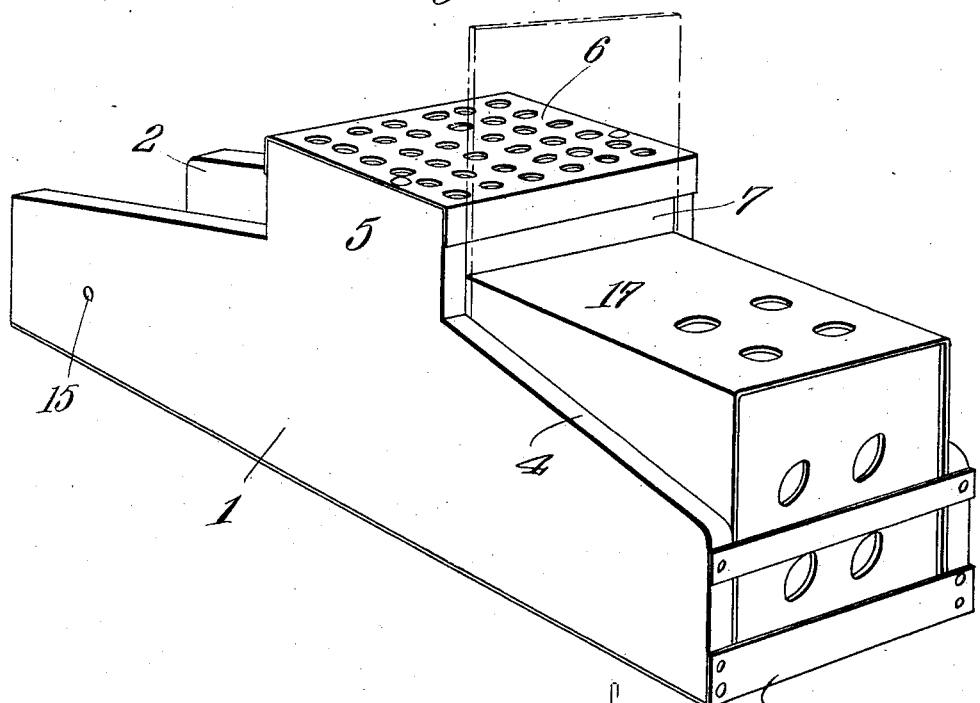
Figure 2:
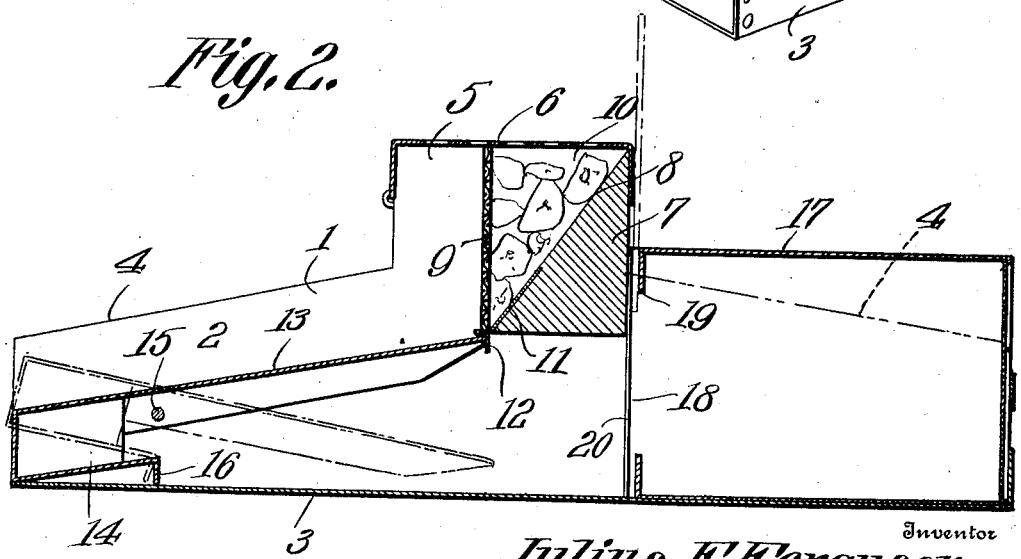

In the accompanying drawing:—Figure 1 is a perspective view of the trap. Fig. 2 is a vertical longitudinal sectional view of the same.

The trap consists of the side pieces 1, which are spaced one from the other, leaving a run-way 2. The pieces 1 are preferably made of wood, and are joined together at their lower edges by a metallic strip 3, which forms a floor to the run-way 2, and a support for the objects located in the said runway. The upper, outer edge portions of the sides 1 incline toward each other at the middles of the sides, and at their middles the said sides are provided with upwardly projecting portions 5, to the upper edges of which is attached a screen 6. A block 7 is inserted between the portions 5 of the side pieces 1 and is provided with a chamfered or beveled upper surface, which surface is located under the screen 6. A screen 9 is secured at its upper edge to the screen 6, and at its lower edge to the lower edge portion of the block 7, and at its side edges to the portions 5 of the side pieces 1. In the space between the surface 8 and the inner sides of the screens 6 and 9 is located edible material, as for instance, cheese, or grain, and in Fig. 2 such material is designated by the reference numeral 10. A metallic strip 11 is attached to the lower portion of the surface 8 of the block 7, and is provided with a depending lip or flange 12, which projects below the lower side of the said block 7.

A tilting platform 13 is located in the run-way 2, and is provided with a weighted outer end 14. The platform 13 is pivoted upon a cross-rod 15, which is secured at its ends in the side pieces 1, and the weighted end 14 of the said platform is provided with a flange 16, which is located under the rod 15, or approximately so, and is designed to prevent the animals, after they have once entered the run-way 2, from passing under the platform 13 toward that end of the runway 2 in which the weighted portion 14 of the platform 13 is located. The platform 13 is of such length that its free edge is adapted to engage the flange 12 of the strip 11 when the platform is in set position. A detachable cell 17 fits snugly in that portion of the run-way 2 opposite the end portion thereof in which the platform 13 is located, and the said cell is provided with an opening 18, which is located at that end of the cell 17 which is disposed toward the free end of the platform 13, and located adjacent the upper and lower portions of the opening 18 are spaced lugs 19, which are adapted to hold a detachable door (not shown) against the flanges 20 provided at the vertical side edges of the opening 18.

From the above description it is obvious that when the trap is placed upon its bottom 3, the animals, attracted by the bait 10, will attempt to pass upon the screen 6. In doing so they will endeavor to pass up the platform 13, and when the animal arrives upon the platform 13 between the rods 15 and the screen 9, its weight will cause the said platform 13 to tilt, and the animal is precipitated down along the free end of the platform 13 into the run-way 2, below the block 7. As soon as the animal moves beyond the end of the platform 13, the weight of the end 14 of the said platform comes into play, and the free end of the said platform is swung into its normal position against the flange 12 provided upon the strip 11. Thus the trap sets itself and the animal passes through the opening 18 into the cell 17.

Inasmuch as it is impossible for the animal to get at the bait, the bait remains intact for an indefinite period of time, and the trap is of that nature generally known as "perpetually baited."

When it is desired to remove the animal from the trap the door above referred to is inserted into the space between the flanges 20 at the sides of the opening 18 and the flanges 19, and thus the animal is imprisoned in the cell 17. The cell 17 is then removed from the run-way 2, and the animal may be destroyed without affecting or tainting the body portion of the trap.

Having described my invention, what I claim as new, and desire to secure, by Letters Patent, is:—

In a trap, the combination with continuous sides and bottom forming a runway of uniform width, a block interposed between the upper portions of the sides at a middle point and having a beveled upper face, and screens extending over said beveled face and between the sides and coöperating therewith to form a bait holding compartment, and a cage removably mounted within the runway between the block and one end of the sides, said cage having an inlet opening adjacent the block and a closure for the opening, of a platform pivotally mounted in the runway between the screens and the other end of the sides, that portion of the platform between the pivot and the adjacent end of the sides being formed thereunder with a weight holding portion, a weight carried by said portion, a flange depending from said portion and supported adjacent the bottom of the runway, said flange constituting means for preventing the escape of rodents under the weight.

In testimony that I claim the foregoing as my own, I have hereto affixed my signature in the presence of two witnesses.

JULIUS F. FERGUSON.

Witnesses:
N. C. CARPENTER,
FREDERICK C. GILLETTE.

---

Copies of this patent may be obtained for five cents each, by addressing the "Commissioner of Patents, Washington, D. C."